United States Patent
Buschardt et al.

(10) Patent No.: US 10,409,730 B2
(45) Date of Patent: Sep. 10, 2019

(54) MICROCONTROLLER FOR MEMORY MANAGEMENT UNIT

(71) Applicant: NVIDIA CORPORATION, Santa Clara, CA (US)

(72) Inventors: Cameron Buschardt, Round Rock, TX (US); Jerome F. Duluk, Jr., Palo Alto, CA (US); John Mashey, Portola Valley, CA (US); Mark Hairgrove, San Jose, CA (US); James Leroy Deming, Madison, AL (US); Brian Fahs, Los Angeles, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 235 days.

(21) Appl. No.: 14/011,643

(22) Filed: Aug. 27, 2013

(65) Prior Publication Data

US 2014/0281364 A1   Sep. 18, 2014
US 2017/0371802 A9   Dec. 28, 2017

Related U.S. Application Data

(60) Provisional application No. 61/800,038, filed on Mar. 15, 2013, provisional application No. 61/800,004, filed on Mar. 15, 2013.

(51) Int. Cl.
*G06F 12/10* (2016.01)
*G06F 12/1009* (2016.01)
*G06F 12/1027* (2016.01)

(52) U.S. Cl.
CPC .......... *G06F 12/1009* (2013.01); *G06F 12/10* (2013.01); *G06F 12/1027* (2013.01); *G06F 2212/301* (2013.01); *G06F 2212/684* (2013.01)

(58) Field of Classification Search
CPC .. G06F 12/1009; G06F 12/10; G06F 12/1027; G06F 2212/684
See application file for complete search history.

(56) References Cited

U.S. PATENT DOCUMENTS 8,880,845 B2 * 11/2014 Kong .......................... 711/206
2005/0144414 A1   6/2005 Yamamoto et al.
(Continued)

OTHER PUBLICATIONS

Harish, How to Disable Copy-on-write and zero filled on demand for mmap, Jun. 2012, stack overflow.*
(Continued)

*Primary Examiner* — Ernest Unelus
(74) *Attorney, Agent, or Firm* — Artegis Law Group, LLP

(57) ABSTRACT

One embodiment of the present invention includes a microcontroller coupled to a memory management unit (MMU). The MMU is coupled to a page table included in a physical memory, and the microcontroller is configured to perform one or more virtual memory operations associated with the physical memory and the page table. In operation, the microcontroller receives a page fault generated by the MMU in response to an invalid memory access via a virtual memory address. To remedy such a page fault, the microcontroller performs actions to map the virtual memory address to an appropriate location in the physical memory. By contrast, in prior-art systems, a fault handler would typically remedy the page fault. Advantageously, because the microcontroller executes these tasks locally with respect to the MMU and the physical memory, latency associated with remedying page faults may be decreased. Consequently, overall system performance may be increased.

24 Claims, 8 Drawing Sheets

(56) References Cited

U.S. PATENT DOCUMENTS

| | | |
|---|---|---|
| 2008/0222644 A1 | 9/2008 | Richards et al. |
| 2009/0300606 A1 | 12/2009 | Miller et al. |
| 2011/0066830 A1 | 3/2011 | Wolfe et al. |
| 2011/0072235 A1* | 3/2011 | Deming .............. G06F 12/1027 711/207 |

OTHER PUBLICATIONS

Non-Final Office Action U.S. Appl. No. 14/011,655, dated Aug. 21, 2015.

* cited by examiner

MICROCONTROLLER FOR MEMORY MANAGEMENT UNIT

CROSS-REFERENCE TO RELATED APPLICATIONS

This application claims benefit of the United States Provisional Patent Application having Ser. No. 61/800,038 filed on Mar. 15, 2013, which is hereby incorporated herein by reference.

BACKGROUND OF THE INVENTION

Field of the Invention

The present invention generally relates to computer science and, more specifically, to a microcontroller for a memory management unit.

Description of the Related Art

A typical computer system includes a central processing unit (CPU) and one or more parallel processing units (GPUs). Some advanced computer systems implement a unified virtual memory architecture common to both the CPU and the GPUs. Among other things, the architecture enables the CPU and the GPUs to access a physical memory location using a common (e.g., the same) virtual memory address, regardless of whether the physical memory location is within system memory or memory local to the GPU.

In operation, a software process executing on a GPU accesses data stored in physical memory via a virtual memory address. To execute the memory access, the GPU memory management unit (MMU) attempts to translate the virtual memory address to a physical memory address. If the translation is successful, then the GPU uses the physical address to access the data stored in a physical memory. However, in some cases, the memory translation is not successful. For example, the GPU may not have the necessary mapping or permissions to access the physical memory. In such scenarios, the GPU MMU will generate a page fault. A page fault may be fatal or non-fatal. If a page fault is non-fatal, then actions may be taken to map the virtual memory access to an appropriate location in physical memory, thereby remedying the page fault. Notably, the efficiency with which a system remedies page faults may impact the execution speed of software processes.

In one approach to remedying a page fault, the GPU interrupts the CPU, and the CPU executes an appropriate "page fault sequence" designed to make the requested memory page available to the GPU. The page fault sequence generally maps the memory page associated with the requested virtual memory address or changes the types of accesses permitted (e.g., read access, write access, etc). One drawback to this approach is that the interrupt response time may be many microseconds, resulting in long stalls in the faulting GPU process. These stalls may increase the execution time of the GPU process and thus reduce overall system efficiency. In addition, the CPU has limited resources and handling page faults generated by the GPU reduces the resources that the CPU may use to perform other operations. This further contributes to inefficiencies in system operation and therefore undermines overall system performance.

In another approach to remedying page faults, the CPU polls for page faults generated by the GPU. Upon detecting a page fault, the CPU executes an appropriate page fault sequence to make the requested memory page available to the GPU. While this approach may reduce the response time of the CPU to memory faults generated by the GPU, this approach does not necessarily remove undesirable fault handling latency. Further, this approach does not address the reduced efficiency of the CPU attributable to handling GPU page faults instead of performing other operations.

As the foregoing illustrates, what is needed in the art is a more efficient approach to remedying page faults in a universal memory architecture.

SUMMARY OF THE INVENTION

One embodiment of the present invention includes a system configured to perform virtual memory operations. The system includes a first memory that includes a page table having page table entries, a memory management unit coupled to the first memory and configured to process requests for translating virtual memory addresses to physical memory addresses and manage the plurality of page table entries, and a microcontroller coupled to the memory management unit and configured to perform one or more operations related to remedying a page fault generated by the memory management unit. The system also includes a parallel processing unit coupled to the first memory, the memory management unit, and the microcontroller.

One advantage of the disclosed techniques is that the microcontroller enables the system to more effectively remedy page faults generated by the parallel processing unit (PPU.) Notably, because the microcontroller performs operations associated with remedying PPU page faults locally with respect to the PPU MMU and the PPU memory, the microcontroller may reduce PPU fault handling latency compared to prior-art techniques. Further, not only does the microcontroller offload some fault handling tasks from the CPU, but the microcontroller also reduces interactions between the CPU and the PPU. Consequently, the microcontroller further increases overall system efficiency compared to prior-art techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
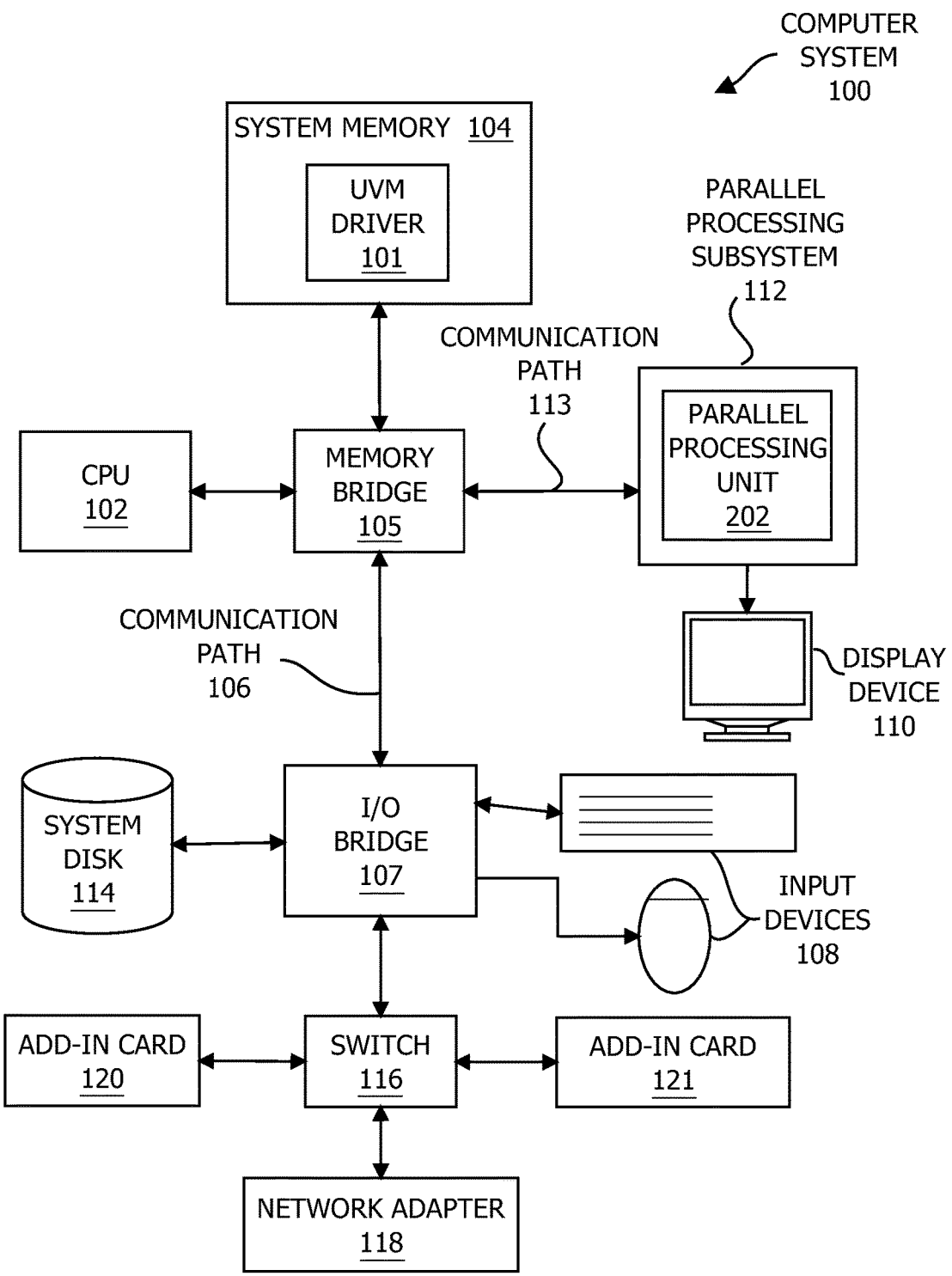
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes one or more parallel processing units (PPUs) 202. In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC). As is well-known, many graphics processing units (GPUs) are designed to perform parallel operations and computations and, thus, are considered to be a class of parallel processing unit (PPU).

Any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

PPU 202 advantageously implements a highly parallel processing architecture. PPU 202 includes a number of general processing clusters (GPCs). Each GPC is capable of executing a large number (e.g., hundreds or thousands) of threads concurrently, where each thread is an instance of a program. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads. Unlike a SIMD execution regime, where all processing engines typically execute identical instructions, SIMT execution allows different threads to more readily follow divergent execution paths through a given thread program.

GPCs include a number of streaming multiprocessors (SMs), where each SM is configured to process one or more thread groups. The series of instructions transmitted to a particular GPC constitutes a thread, as previously defined herein, and the collection of a certain number of concurrently executing threads across the parallel processing engines within an SM is referred to herein as a "warp" or "thread group." As used herein, a "thread group" refers to a group of threads concurrently executing the same program on different input data, with one thread of the group being assigned to a different processing engine within an SM. Additionally, a plurality of related thread groups may be active (in different phases of execution) at the same time within an SM. This collection of thread groups is referred to herein as a "cooperative thread array" ("CTA") or "thread array."

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

In operation, CPU 102 is the master processor of computer system 100, controlling and coordinating operations of other system components. In particular, CPU 102 issues commands that control the operation of PPUs 202. In one embodiment, communication path 113 is a PCI Express link, in which dedicated lanes are allocated to each PPU 202, as is known in the art. Other communication paths may also be used. PPU 202 advantageously implements a highly parallel processing architecture. A PPU 202 may be provided with any amount of local parallel processing memory (PPU memory).

In some embodiments, system memory 104 includes a unified virtual memory (UVM) driver 101. The UVM driver 101 includes instructions for performing various tasks related to management of a unified virtual memory (UVM) system common to both the CPU 102 and the PPUs 202. Among other things, the architecture enables the CPU 102 and the PPU 202 to access a physical memory location using a common virtual memory address, regardless of whether the physical memory location is within the system memory 104 or memory local to the PPU 202.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Unified Virtual Memory System Architecture

Figure 2:
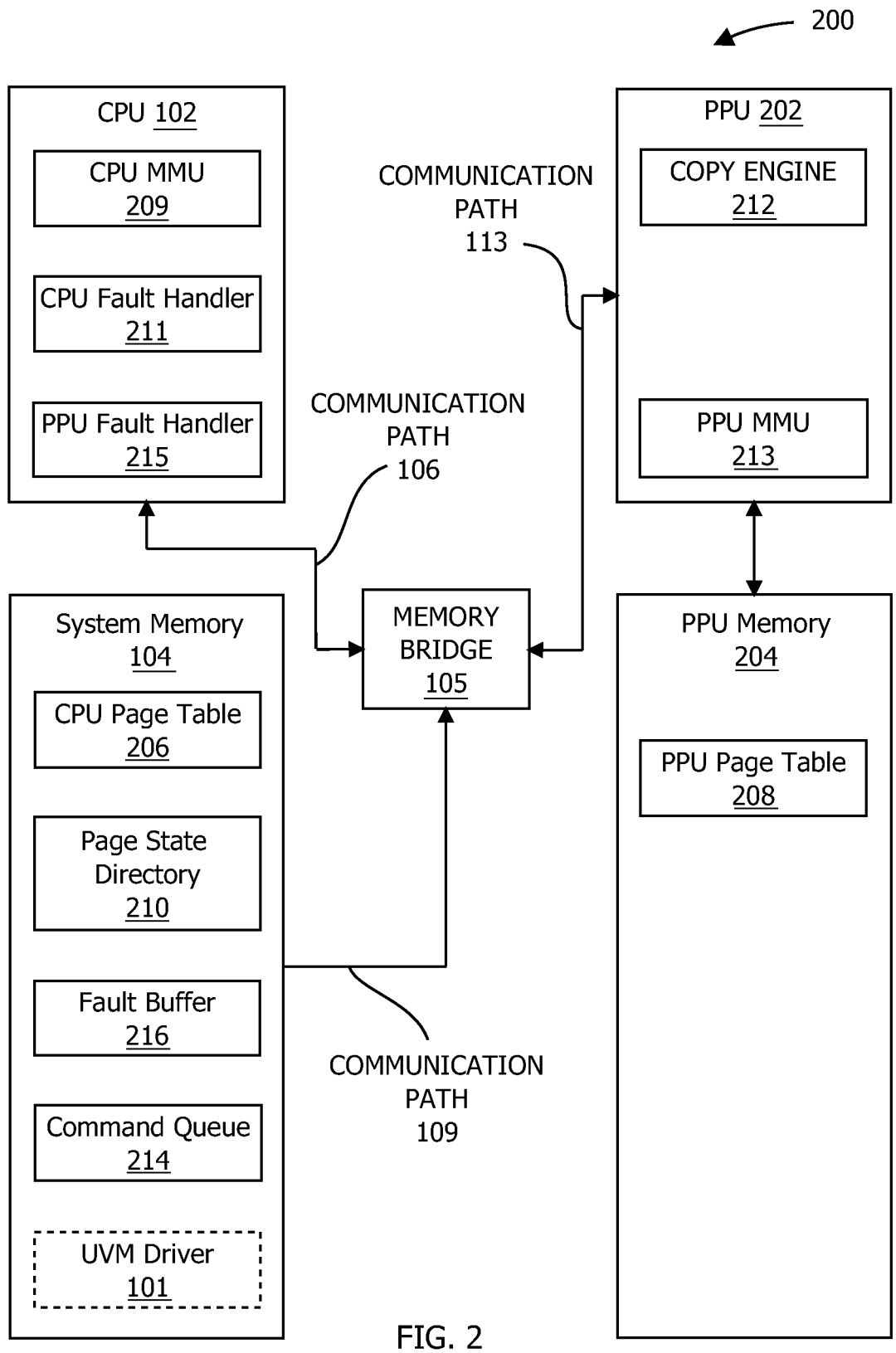
FIG. 2 is a block diagram illustrating a unified virtual memory system (UVM), according to one embodiment of the present invention.

FIG. 2 is a block diagram illustrating a unified virtual memory (UVM) system 200, according to one embodiment of the present invention. As shown, the unified virtual memory system 200 includes, without limitation, the CPU 102, the system memory 104, and the parallel processing unit (PPU) 202 coupled to a parallel processing unit memory (PPU memory) 204. The CPU 102 and the system memory 104 are coupled to each other and to the PPU 202 via the memory bridge 105.

The CPU 102 executes threads that may request data stored in the system memory 104 or the PPU memory 204 via a virtual memory address. Virtual memory addresses shield threads executing in the CPU 102 from knowledge about the internal workings of a memory system. Thus, a thread may only have knowledge of virtual memory addresses, and may access data by requesting data via a virtual memory address.

The CPU 102 includes a CPU MMU 209, which processes requests from the CPU 102 for translating virtual memory addresses to physical memory addresses. The physical memory addresses are required to access data stored in a physical memory unit such as the system memory 104 and the PPU memory 204. The CPU 102 includes a CPU fault handler 211, which executes steps in response to the CPU MMU 209 generating a page fault, to make requested data available to the CPU 102. The CPU fault handler 211 is generally software that resides in the system memory 104 and executes on the CPU 102, the software being provoked by an interrupt to the CPU 102.

The system memory 104 stores various memory pages (not shown) that include data for use by threads executing on the CPU 102 or the PPU 202. As shown, the system memory 104 stores a CPU page table 206, which includes mappings between virtual memory addresses and physical memory addresses. The system memory 104 also stores a page state directory 210, which acts as a "master page table" for the UVM system 200, as is discussed in greater detail below. The system memory 104 stores a fault buffer 216, which includes entries written by the PPU 202 in order to inform the CPU 102 of a page fault generated by the PPU 202. In some embodiments, the system memory 104 includes the unified virtual memory (UVM) driver 101, which includes instructions that, when executed, cause the CPU 102 to execute commands for, among other things, remedying a page fault. In alternative embodiments, any combination of the page state directory 210, the fault buffer 216, and one or more command queues 214 may be stored in the PPU memory 204. Further, a PPU page table 208 may be stored in the system memory 104.

In a similar manner as with the CPU 102, the PPU 202 executes instructions that may request data stored in the system memory 104 or the PPU memory 204 via a virtual memory address. The PPU 202 includes a PPU MMU 213, which processes requests from the PPU 202 for translating virtual memory addresses to physical memory addresses. The PPU 202 also includes a copy engine 212, which executes commands stored in the command queue 214 for copying memory pages, modifying data in the PPU page table 208, and other commands. A PPU fault handler 215 executes steps in response to a page fault on the PPU 202. The PPU fault handler 215 can be software running on a processor or dedicated microcontroller in the PPU 202. Alternatively, the PPU fault handler 215 can be combination of software running on the CPU 102 and software running on the dedicated microcontroller in the PPU 202, communicating with each other. In some embodiments, the CPU fault handler 211 and the PPU fault handler 215 can be a unified software program that is invoked by a fault on either the CPU 102 or the PPU 202. The command queue 214 may be in either the PPU memory 204 or the system memory 104, but is preferentially located in the system memory 104.

In some embodiments, the CPU fault handler 211 and the UVM driver 101 may be a unified software program. In such cases, the unified software program may be software that resides in the system memory 104 and executes on the CPU 102. The PPU fault handler 215 may be a separate software program running on a processor or dedicated microcontroller in the PPU 202, or the PPU fault handler 215 may be a separate software program running on the CPU 102.

In other embodiments, the PPU fault handler 215 and the UVM driver 101 may be a unified software program. In such cases, the unified software program may be software that resides in the system memory 104 and executes on the CPU 102. The CPU fault handler 211 may be a separate software program that resides in the system memory 104 and executes on the CPU 102.

In other embodiments, the CPU fault handler 211, the PPU fault handler 215, and the UVM driver 101 may be a unified software program. In such cases, the unified software program may be software that resides in the system memory 104 and executes on the CPU 102.

In some embodiments, the CPU fault handler 211, the PPU fault handler 215, and the UVM driver 101 may all reside in system memory 104, as described above. As shown in FIG. 2, the UVM driver 101 resides in system memory 104, while the CPU fault handler 211 and the PPU fault handler 215 reside in the CPU 102.

The CPU fault handler 211 and the PPU fault handler 215 are responsive to hardware interrupts that may emanate from the CPU 102 or the PPU 202, such as interrupts resulting from a page fault. As further described below, the UVM driver 101 includes instructions for performing various tasks related to management of the UVM system 200, including, without limitation, remedying a page fault, and accessing the CPU page table 206, the page state directory 210, and/or the fault buffer 216.

In some embodiments, the CPU page table 206 and the PPU page table 208 have different formats, and contain different information; for example, the PPU page table 208 may contain the following while the CPU page table 206 does not: atomic disable bit; compression tags; and memory swizzling type.

In a similar manner as with the system memory 104, the PPU memory 204 stores various memory pages (not shown). As shown, the PPU memory 204 also includes the PPU page table 208, which includes mappings between virtual memory addresses and physical memory addresses. Alternatively, the PPU page table 208 may be stored in the system memory 104.

Translating Virtual Memory Addresses

When a thread executing in the CPU 102 requests data via a virtual memory address, the CPU 102 requests translation of the virtual memory address to a physical memory address, from the CPU memory management unit (CPU MMU) 209. In response, the CPU MMU 209 attempts to translate the virtual memory address into a physical memory address, which specifies a location in a memory unit, such as the system memory 104, that stores the data requested by the CPU 102.

To translate a virtual memory address to a physical memory address, the CPU MMU 209 performs a lookup operation to determine if the CPU page table 206 includes a mapping associated with the virtual memory address. In addition to a virtual memory address, a request to access data may also indicate a virtual memory address space. The unified virtual memory system 200 may implement multiple virtual memory address spaces, each of which is assigned to one or more threads. Virtual memory addresses are unique within any given virtual memory address space. Further, virtual memory addresses within a given virtual memory address space are consistent across the CPU 102 and the PPU 202, thereby allowing the same virtual address to refer to the same data across the CPU 102 and the PPU 202. In some embodiments, two virtual memory addresses may refer to the same data, but may not map to the same physical memory address (e.g., the CPU 102 and the PPU 202 may each have a local read-only copy of the data.)

For any given virtual memory address, the CPU page table 206 may or may not include a mapping between the virtual memory address and a physical memory address. If the CPU page table 206 includes a mapping, then the CPU MMU 209 reads that mapping to determine a physical memory address associated with the virtual memory address and provides that physical memory address to the CPU 102. However, if the CPU page table 206 does not include a mapping associated with the virtual memory address, then the CPU MMU 209 is unable to translate the virtual memory address into a physical memory address, and the CPU MMU 209 generates a page fault. To remedy a page fault and make the requested data available to the CPU 102, a "page fault sequence" is executed. More specifically, the CPU 102 reads the PSD 210 to find the current mapping state of the page and then determines the appropriate page fault sequence. The page fault sequence generally maps the memory page associated with the requested virtual memory address or changes the types of accesses permitted (e.g., read access, write access, atomic access). The different types of page fault sequences implemented in the UVM system 200 are discussed in greater detail below.

Within the UVM system 200, data associated with a given virtual memory address may be stored in the system memory 104, in the PPU memory 204, or in both the system memory 104 and the PPU memory 204 as read-only copies of the same data. Further, for any such data, either or both of the CPU page table 206 or the PPU page table 208 may include a mapping associated with that data. Notably, some data exists for which a mapping exists in one page table, but not in the other. However, the PSD 210 includes all mappings stored in the PPU page table 208, and the PPU-relevant mappings stored in the CPU page table 206. The PSD 210 thus functions as a "master" page table for the unified virtual memory system 200. Therefore, when the CPU MMU 209 does not find a mapping in the CPU page table 206 associated with a particular virtual memory address, the CPU 102 reads the PSD 210 to determine whether the PSD 210 includes a mapping associated with that virtual memory address. Various embodiments of the PSD 210 may include different types of information associated with virtual memory addresses in addition to mappings associated with the virtual memory address.

When the CPU MMU 209 generates a page fault, the CPU fault handler 211 executes a sequence of operations for the appropriate page fault sequence to remedy the page fault. Again, during a page fault sequence, the CPU 102 reads the PSD 210 and executes additional operations in order to change the mappings or permissions within the CPU page table 206 and the PPU page table 208. Such operations may include reading and/or modifying the CPU page table 206, reading and/or modifying page state directory 210 entries, and/or migrating blocks of data referred to as "memory pages" between memory units (e.g., the system memory 104 and the PPU memory 204).

To determine which operations to execute in a page fault sequence, the CPU 102 identifies the memory page associated with the virtual memory address. The CPU 102 then reads state information for the memory page from the PSD 210 related to the virtual memory address associated with the memory access request that caused the page fault. Such state information may include, among other things, an ownership state for the memory page associated with the virtual memory address. For any given memory page, several ownership states are possible. For example, a memory page may be "CPU-owned," "PPU-owned," or "CPU-shared." A memory page is considered CPU-owned if the CPU 102 can access the memory page via a virtual address, and if the PPU 202 cannot access the memory page via a virtual address without causing a page fault. Preferably, a CPU-owned page resides in the system memory 104, but can reside in the PPU memory 204. A memory page is considered PPU-owned if the PPU 202 can access the page via a virtual address, and if the CPU 102 cannot access the memory page via a virtual address without causing a page fault. Preferably, a PPU-owned page resides in the PPU memory 204, but can reside in the system memory 104 when migration from the system memory 104 to the PPU memory 204 is not done, generally due to the short-term nature of the PPU ownership. Finally, a memory page is considered CPU-shared if the memory page is stored in the system memory 104 and a mapping to the memory page exists in the PPU page table 208 that allows the PPU 202 to access the memory page in the system memory 104 via a virtual memory address.

The UVM system 200 may assign ownership states to memory pages based on a variety of factors, including the usage history of the memory page. Usage history may include information regarding whether the CPU 102 or the PPU 202 accessed the memory page recently, and how many times such accesses were made. For example, the UVM system 200 may assign an ownership state of "CPU-owned" for a given memory page and locate the page in system memory 104 if, based on the usage history of the memory page, the UVM system 200 determines that the memory page is likely to be used mostly or only by the CPU 102. Similarly, the UVM system 200 may assign an ownership of "PPU-owned" for a given memory page and locate the page in PPU memory 204 if, based on the usage history of the memory page, the UVM system 200 determines that the memory page is likely to be used mostly or only by the PPU 202. Finally, the UVM system 200 may assign an ownership of "CPU-shared" for a given memory page if, based on the usage history of the memory page, the UVM system 200 determines that the memory page is likely to be used both by the CPU 102 and by the PPU 202, and that migrating the memory page back and forth from the system memory 104 to the PPU memory 204 would consume too much time.

As examples, the fault handlers 211 and 215 can implement any or all of the following heuristics for migrating:

(a) on the CPU 102 access to an unmapped page that is mapped to the PPU 202, that has not been recently migrated, unmap the faulting page from the PPU 202, migrate the page to the CPU 102, and map the page to the CPU 102;

(b) on the PPU 202 access to an unmapped page that is mapped to the CPU 102, that has not been recently migrated, unmap the faulting page from the CPU 102, migrate the page to the PPU 202, and map the page to the PPU 202;

(c) on the CPU 102 access to an unmapped page that is mapped to the PPU 202, that has been recently migrated, migrate the faulting page to the CPU 102 and map the page on both the CPU 102 and the PPU 202;

(d) on the PPU 102 access to an unmapped page that is mapped on the CPU 102, that has been recently migrated, map the page to both the CPU 102 and the PPU 202;

(e) on the PPU 102 atomic access to page that is mapped to both the CPU 102 and the PPU 202 but not enabled for atomic operations by the PPU 202, unmap the page from the CPU 102, and map to the PPU 202 with atomic operations enabled;

(f) on the PPU 102 write access to page that is mapped on the CPU 102 and PPU 202 as copy-on-write (COW), copy the page to the PPU 202, thereby making independent copies of the page, mapping the new page as read-write on the PPU, and leaving the current page as mapped on the CPU 102;

(g) on the PPU 102 read access to page that is mapped on the CPU 102 and PPU 202 as zero-fill-on-demand (ZFOD), allocate a page of physical memory on the PPU 202 and fill it with zeros, and map that page on the PPU, but change it to unmapped on the CPU 102.

(h) on an access by a first PPU 202(1) to an unmapped page that is mapped on a second PPU 202(2), that has not been recently migrated, unmap the faulting page from the second PPU 202(2), migrate the page to the first PPU 202(1), and map the page to the first PPU 202(1); and (i) on an access by a first PPU 202(1) to an unmapped page that is mapped on a second PPU 202(2), that has been recently migrated, map the faulting page to the first PPU 202(1), and keep the mapping of the page on the second PPU 202(2).

In sum, many heuristic rules are possible, and the scope of the present invention is not limited to these examples.

In addition, any migration heuristic can "round up" to include more pages or a larger page size, for example:

(j) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, and map the pages to the CPU 102 (in more detailed example: for a 4 kB faulted page, migrate the aligned 64 kB region that includes the 4 kB faulted page);

(k) on the PPU 202 access to an unmapped page that is mapped to the CPU 102, that has not been recently migrated, unmap the faulting page, plus additional pages that are adjacent to the faulting page in the virtual address space, from the CPU 102, migrate the pages to the PPU 202, and map the pages to the PPU 202 (in more detailed example: for a 4 kB faulted page, migrate the aligned 64 kB region that includes the 4 kB faulted page);

(l) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, map the pages to the CPU 102, and treat all the migrated pages as one or more larger pages on the CPU 102 (in more detailed example: for a 4 kB faulted page, migrate the aligned 64 kB region that includes the 4 kB faulted page, and treat the aligned 64 kB region as a 64 kB page);

(m) on the PPU 202 access to an unmapped page that is mapped on the CPU 102, that has not been recently migrated, unmap the faulting page, plus additional pages that are adjacent to the faulting page in the virtual address space, from the CPU 102, migrate the pages to the PPU 202, map the pages to the PPU 202, and treat all the migrated pages as one or more larger pages on the PPU 202 (in more detailed example: for a 4 kB faulted page, migrate the aligned 64 kB region that includes the 4 kB faulted page, and treat the aligned 64 kB region as a 64 kB page);

(n) on the access by a first PPU 202(1) to an unmapped page that is mapped to a second PPU 202(2), that has not been recently migrated, unmap the faulting page, plus additional pages that are adjacent to the faulting page in the virtual address space, from the second PPU 202(2), migrate the pages to the first PPU 202(1), and map the pages to the first PPU 202(1); and (o) on an access by a first PPU 202(1) to an unmapped page that is mapped to a second PPU 202(2), that has been recently migrated, map the faulting page, plus additional pages that are adjacent to the faulting page in the virtual address space, to the first PPU 202(1), and keep the mapping of the page on the second PPU 202(2).

In sum, many heuristic rules that include "rounding up" are possible, and scope of the present invention is not limited to these examples.

In some embodiments, the PSD entries may include transitional state information to ensure proper synchronization between various requests made by units within the CPU 102 and the PPU 202. For example, a PSD 210 entry may include a transitional state indicating that a particular page is in the process of being transitioned from CPU-owned to PPU-owned. Various units in the CPU 102 and the PPU 202, such as the CPU fault handler 211 and the PPU fault handler 215, upon determining that a page is in such a transitional state, may forego portions of a page fault sequence to avoid steps in a page fault sequence triggered by a prior virtual memory access to the same virtual memory address. As a specific example, if a page fault results in a page being migrated from the system memory 104 to the PPU memory 204, a different page fault that would cause the same migration is detected and does not cause another page migration. Further, various units in the CPU 102 and the PPU 202 may implement atomic operations for proper ordering of operations on the PSD 210. For example, for modifications to PSD 210 entries, the CPU fault handler 211 or the PPU fault handler 215 may issue an atomic compare and swap operation to modify the page state of a particular entry in the PSD 210. Consequently, the modification is done without interference by operations from other units.

Multiple PSDs 210 may be stored in the system memory 104—one for each virtual memory address space. A memory access request generated by either the CPU 102 or the PPU 202 may therefore include a virtual memory address and also identify the virtual memory address space associated with that virtual memory address.

Just as the CPU 102 may execute memory access requests that include virtual memory addresses (i.e., instructions that include requests to access data via a virtual memory address), the PPU 202 may also execute similar types of memory access requests. More specifically, the PPU 202 includes a plurality of execution units, such as GPCs and SMs, described above in conjunction with FIG. 1, that are configured to execute multiple threads and thread groups. In operation, those threads may request data from memory (e.g., the system memory 104 or the PPU memory 204) by specifying a virtual memory address. Just as with the CPU 102 and the CPU MMU 209, the PPU 202 includes the PPU memory management unit (MMU) 213. The PPU MMU 213 receives requests for translation of virtual memory addresses from the PPU 202, and attempts to provide a translation from the PPU page table 208 for the virtual memory addresses.

Similar to the CPU page table 206, the PPU page table 208 includes mappings between virtual memory addresses and physical memory addresses. As is also the case with the CPU page table 206, for any given virtual address, the PPU page table 208 may not include a page table entry that maps the virtual memory address to a physical memory address. As with the CPU MMU 209, when the PPU MMU 213 requests a translation for a virtual memory address from the PPU page table 208 and either no mapping exists in the PPU page table 208 or the type of access is not allowed by the PPU page table 208, the PPU MMU 213 generates a page fault. Subsequently, the PPU fault handler 215 triggers a page fault sequence. Again, the different types of page fault sequences implemented in the UVM system 200 are described in greater detail below.

During a page fault sequence, the CPU 102 or the PPU 202 may write commands into the command queue 214 for execution by the copy engine 212. Such an approach frees up the CPU 102 or the PPU 202 to execute other tasks while the copy engine 212 reads and executes the commands stored in the command queue 214, and allow all the commands for a fault sequence to be queued at one time, thereby avoiding the monitoring of progress of the fault sequence. Commands executed by the copy engine 212 may include, among other things, deleting, creating, or modifying page table entries in the PPU page table 208, reading or writing data from the system memory 104, and reading or writing data to the PPU memory 204.

The fault buffer 216 stores fault buffer entries that indicate information related to page faults generated by the PPU 202. Fault buffer entries may include, for example, the type of access that was attempted (e.g., read, write, or atomic), the virtual memory address for which an attempted access caused a page fault, the virtual address space, and an indication of a unit or thread that caused a page fault. In operation, when the PPU 202 causes a page fault, the PPU 202 may write a fault buffer entry into the fault buffer 216 to inform the PPU fault handler 215 about the faulting page and the type of access that caused the fault. The PPU fault handler 215 then performs actions to remedy the page fault. The fault buffer 216 can store multiple faults because the PPU 202 is executing a plurality of threads, where each thread can cause a one or more faults due the pipelined nature of the memory accesses of the PPU 202.

Page Fault Sequences

As stated above, in response to receiving a request for translation of a virtual memory address, the CPU MMU 209 generates a page fault if the CPU page table 206 does not include a mapping associated with the requested virtual memory address or does not permit the type of access being requested. Similarly, in response to receiving a request for translation of a virtual memory address, the PPU MMU 213 generates a page fault if the PPU page table 208 does not include a mapping associated with the requested virtual memory address or does not permit the type of access being requested. When the CPU MMU 209 or the PPU MMU 213 generates a page fault, the thread that requested the data at the virtual memory address stalls, and a "local fault handler"—the CPU fault handler 211 for the CPU 102 or the PPU fault handler 215 for the PPU 202—attempts to remedy the page fault by executing a "page fault sequence." As indicated above, a page fault sequence includes a series of operations that enable the faulting unit (i.e., the unit—either the CPU 102 or the PPU 202—that caused the page fault) to access the data associated with the virtual memory address. After the page fault sequence completes, the thread that requested the data via the virtual memory address resumes execution. In some embodiments, fault recovery is simplified by allowing the fault recovery logic to track faulting memory accesses as opposed to faulting instructions.

The operations executed during a page fault sequence depend on the change in ownership state or change in access permissions, if any, that the memory page associated with the page fault has to undergo. The transition from a current ownership state to a new ownership state, or a change in access permissions, may be part of the page fault sequence. In some instances, migrating the memory page associated with the page fault from the system memory 104 to the PPU memory 204 is also part of the page fault sequence. In other instances, migrating the memory page associated with the page fault from the PPU memory 204 to the system memory 104 is also part of the page fault sequence. Various heuristics, more fully described herein, may be used to configure UVM system 200 to change memory page ownership state or to migrate memory pages under various sets of operating conditions and patterns. Described in greater detail below are page fault sequences for the following four memory page ownership state transitions: CPU-owned to CPU-shared, CPU-owned to PPU-owned, PPU-owned to CPU-owned, and PPU-owned to CPU-shared.

A fault by the PPU 202 may initiate a transition from CPU-owned to CPU-shared. Prior to such a transition, a thread executing in the PPU 202 attempts to access data at a virtual memory address that is not mapped in the PPU page table 208. This access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state as well as other factors, such as usage characteristics for the memory page or the type of memory access, the PPU fault handler 215 determines that a new ownership state for the page should be CPU-shared.

To change the ownership state, the PPU fault handler 215 writes a new entry in the PPU page table 208 corresponding to the virtual memory address and associating the virtual memory address with the memory page identified via the PSD 210 entry. The PPU fault handler 215 also modifies the PSD 210 entry for that memory page to indicate that the ownership state is CPU-shared. In some embodiments, an entry in a translation look-aside buffer (TLBs) in the PPU 202 is invalidated to account for the case where the translation to an invalid page is cached. At this point, the page fault sequence is complete. The ownership state for the memory page is CPU-shared, meaning that the memory page is accessible to both the CPU 102 and the PPU 202. Both the CPU page table 206 and the PPU page table 208 include entries that associate the virtual memory address to the memory page.

A fault by the PPU 202 may initiate a transition from CPU-owned to PPU-owned. Prior to such a transition, an operation executing in the PPU 202 attempts to access memory at a virtual memory address that is not mapped in the PPU page table 208. This memory access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state, as well as other factors, such as usage characteristics for the page or the type of memory access, the PPU fault handler 215 determines that a new ownership state for the page is PPU-owned.

The PPU 202 writes a fault buffer entry into fault buffer 216 that indicates that the PPU 202 generated a page fault, and indicates the virtual memory address associated with the page fault. The PPU fault hander 215 executing on the CPU 102 reads the fault buffer entry and, in response, the CPU 102 removes the mapping in the CPU page table 206 associated with the virtual memory address that caused the page fault. The CPU 102 may flush caches before and/or after the mapping is removed. The CPU 102 also writes commands into the command queue 214 instructing the PPU 202 to copy the page from the system memory 104 into the PPU memory 204. The copy engine 212 in the PPU 202 reads the commands in the command queue 214 and copies the page from the system memory 104 to the PPU memory 204. The PPU 202 writes a page table entry into the PPU page table 208 corresponding to the virtual memory address and associating the virtual memory address with the newly-copied memory page in the PPU memory 204. The writing to the PPU page table 208 may be done via the copy engine 212. Alternatively, the CPU 102 can update the PPU page table 208. The PPU fault handler 215 also modifies the PSD 210 entry for that memory page to indicate that the ownership state is PPU-owned. In some embodiments, entries in TLBs in the PPU 202 or the CPU 102 may be invalidated, to account for the case where the translation was cached. At this point, the page fault sequence is complete. The ownership state for the memory page is PPU-owned, meaning that the memory page is accessible only to the PPU 202. Only the PPU page table 208 includes an entry that associates the virtual memory address with the memory page.

A fault by the CPU 102 may initiate a transition from PPU-owned to CPU-owned. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state, as well as other factors, such as usage characteristics for the page or the type of access, the CPU fault handler 211 determines that a new ownership state for the page is CPU-owned.

The CPU fault handler 211 changes the ownership state associated with the memory page to CPU-owned. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104, which may be done via the command queue 214 and the copy engine 212. The CPU fault handler 211 writes a page table entry into the CPU page table 206 that associates the virtual memory address with the memory page that is copied into the system memory 104. The CPU fault handler 211 also updates the PSD 210 to associate the virtual memory address with the newly copied memory page. At this point, the page fault sequence is complete. The ownership state for the memory page is CPU-owned, meaning that the memory page is accessible only to the CPU 102. Only the CPU page table 206 includes an entry that associates the virtual memory address with the memory page.

A fault by the CPU 102 may initiate a transition from PPU-owned to CPU-shared. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state or the type of access, as well as other factors, such as usage characteristics for the page, the CPU fault handler 211 determines that a new ownership state for the memory page is CPU-shared.

The CPU fault handler 211 changes the ownership state associated with the memory page to CPU-shared. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104. This copy operation may be done via the command queue 214 and the copy engine 212. The CPU fault handler 211 then writes a command into the command queue 214 to cause the copy engine 212 to change the entry in PPU page table 208 such that the virtual memory address is associated with the memory page in the system memory 104. Various TLB entries may be invalidated. The CPU fault handler 211 writes a page table entry into the CPU page table 206 to associate the virtual memory address with the memory page in the system memory 104. The CPU fault handler 211 also updates the PSD 210 to associate the virtual memory address with the memory page in system memory 104. At this point, the page fault sequence is complete. The ownership state for the page is CPU-shared, and the memory page has been copied into the system memory 104. The page is accessible to the CPU 102, since the CPU page table 206 includes an entry that associates the virtual memory address with the memory page in the system memory 104. The page is also accessible to the PPU 202, since the PPU page table 208 includes an entry that associates the virtual memory address with the memory page in the system memory 104.

Detailed Example of a Page Fault Sequence

With this context, a detailed description of a page fault sequence executed by the PPU fault handler 215 in the event of a transition from CPU-owned to CPU-shared is now provided to show how atomic operations and transition states may be used to more effectively manage a page fault sequence. The page fault sequence is triggered by a PPU 202 thread attempting to access a virtual address for which a mapping does not exist in the PPU page table 208. When a thread attempts to access data via a virtual memory address, the PPU 202 (specifically, a user-level thread) requests a translation from the PPU page table 208. A PPU page fault occurs in response because the PPU page table 208 does not include a mapping associated with the requested virtual memory address.

After the page fault occurs, the thread enters a trap, stalls, and the PPU fault handler 215 executes a page fault sequence. The PPU fault handler 215 reads the PSD 210 to determine which memory page is associated with the virtual memory address and to determine the state for the virtual memory address. The PPU fault handler 215 determines, from the PSD 210, that the ownership state for that memory page is CPU-owned. Consequently, the data requested by the PPU 202 is inaccessible to the PPU 202 via a virtual memory address. State information for the memory page also indicates that the requested data cannot be migrated to the PPU memory 204.

Based on the state information obtained from the PSD 210, the PPU fault handler 215 determines that a new state for the memory page should be CPU-shared. The PPU fault handler 215 changes the state to "transitioning to CPU-shared." This state indicates that the page is currently in the process of being transitioned to CPU-shared. When the PPU fault handler 215 runs on a microcontroller in the memory management unit, then two processors will update the PSD 210 asynchronously, using atomic compare-and-swap ("CAS") operations on the PSD 210 to change the state to "transitioning to GPU visible," (CPU-shared).

The PPU 202 updates the PPU page table 208 to associate the virtual address with the memory page. The PPU 202 also invalidates the TLB cache entries. Next, the PPU 202 performs another atomic compare-and-swap operation on the PSD 210 to change the ownership state associated with the memory page to CPU-shared. Finally, the page fault sequence ends, and the thread that requested the data via the virtual memory address resumes execution.

UVM System Architecture Variations

Various modifications to the unified virtual memory system 200 are possible. For example, in some embodiments, after writing a fault buffer entry into the fault buffer 216, the PPU 202 may trigger a CPU interrupt to cause the CPU 102 to read fault buffer entries in the fault buffer 216 and perform whatever operations are appropriate in response to the fault buffer entry. In other embodiments, the CPU 102 may periodically poll the fault buffer 216. In the event that the CPU 102 finds a fault buffer entry in the fault buffer 216, the CPU 102 executes a series of operations in response to the fault buffer entry.

In some embodiments, the system memory 104, rather than the PPU memory 204, stores the PPU page table 208. In other embodiments, a single or multiple-level cache hierarchy, such as a single or multiple-level translation look-aside buffer (TLB) hierarchy (not shown), may be implemented to cache virtual address translations for either the CPU page table 206 or the PPU page table 208.

In yet other embodiments, in the event that a thread executing in the PPU 202 causes a PPU fault (a "faulting thread"), the PPU 202 may take one or more actions. These actions include: stall the entire PPU 202, stall the SM executing the faulting thread, stall the PPU MMU 213, stall only the faulting thread, or stall one or more levels of TLBs. In some embodiments, after a PPU page fault occurs, and a page fault sequence has been executed by the unified virtual memory system 200, execution of the faulting thread resumes, and the faulting thread attempts, again, to execute the memory access request that caused the page fault. In some embodiments, stalling at a TLB is done in such a way as to appear as a long-latency memory access to the faulting SM or faulting thread, thereby not requiring the SM to do any special operation for a fault.

Finally, in other alternative embodiments, the UVM driver 101 may include instructions that cause the CPU 102 to execute one or more operations for managing the UVM system 200 and remedying a page fault, such as accessing the CPU page table 206, the PSD 210, and/or the fault buffer 216. In other embodiments, an operating system kernel (not shown) may be configured to manage the UVM system 200 and remedy a page fault by accessing the CPU page table 206, the PSD 210, and/or the fault buffer 216. In yet other embodiments, an operating system kernel may operate in conjunction with the UVM driver 101 to manage the UVM system 200 and remedy a page fault by accessing the CPU page table 206, the PSD 210, and/or the fault buffer 21.

PPU with a Microcontroller to Assist the Memory Management Unit

As set forth above, the UVM system 200 typically relies on the CPU 102 for remedying, at least in part, page faults generated by the PPU 202. Unfortunately, when the CPU 102 remedies page faults generated by the PPU 202, the efficiency of the computer system 100 may be decreased. Advantageously, some embodiments of the computer system 100 include a microcontroller to handle certain tasks related to remedying page faults that the one or more components would otherwise handle. By handling such operations, the microcontroller reduces the number of tasks that the CPU 102 and/or other components in the UVM system 200 execute. Further, by offloading fault-handling tasks to the microcontroller, the computer system 100 may respond to and remedy PPU-related page faults more efficiently than prior-art systems.

Figure 3:
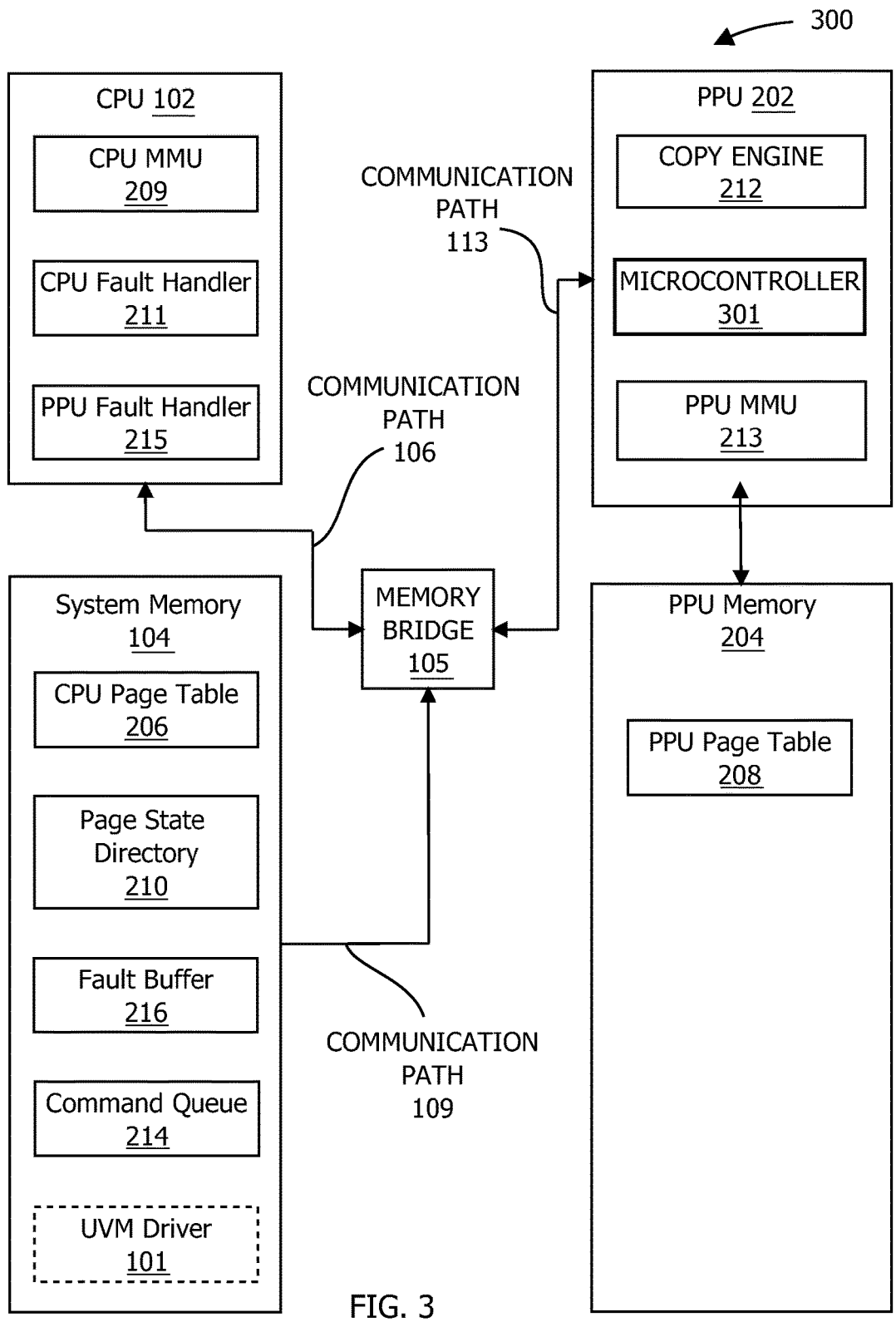
FIG. 3 is a block diagram illustrating a unified virtual memory (UVM) system configured with a microcontroller, according to another embodiment of the present invention.

FIG. 3 is a block diagram of a UVM system 300 configured with a microcontroller 301, according to another embodiment of the present invention. The UVM system 300 is one implementation of the UVM system 200 of FIG. 2. In addition to the elements described above with respect to FIGS. 1 and 2, the UVM system 300 includes the microcontroller 301 within the PPU 202. As shown, the microcontroller 301 is coupled to the PPU MMU 213 and handles some tasks that are otherwise carried out by one or more other elements within the UVM system 300.

As previously disclosed, a thread interacts with physical memory pages via virtual memory addresses which shield the thread from knowledge about the internal workings of a memory subsystem. Consequently, the computer system 100 may optimize the performance of memory operations without perturbing the threads. Similarly, the computer system 100 may optimize the performance of memory operations without perturbing a software application that launches the threads. Advantageously, the microcontroller 301 may be configured to perform many different tasks related to managing and effecting memory access operations for the threads executing within PPU 202. In particular, the microcontroller 301 is configured to perform tasks related to remedying page faults generated by the PPU 202. Three specific examples of such tasks include zero-fill-on-demand (ZFOD) operations, copy-on-write (COW) operations, and "lazy" migration operations. Persons skilled in the art will appreciate that the examples described herein are illustrative only and in no way limit the scope of the present invention.

In a first example, the microcontroller 301 is configured to perform zero-fill-on-demand (ZFOD) operations. In some embodiments, when a software application that is leveraging the PPU 202 requests one or more zero-filled memory pages (e.g., memory pages having all binary zeros) without accessing the pages, the zero-filled memory pages are not stored in physical memory. More specifically, entries included in the PSD 210 associate the zero-filled memory pages that are not stored in physical memory with a status of ZFOD. The ZFOD status may be reflected in any technically feasible fashion, such as a dedicated bit that indicates ZFOD. Further, the PPU page table 208 includes page table entries that configure the PPU MMU 213 to fault on any access to ZFOD memory pages that are not stored in physical memory. There are no physical addresses associated with the ZFOD memory pages that are not stored in physical memory.

In one embodiment, if the software application attempts to read from a ZFOD memory page that is not stored in physical memory via a particular virtual address, then the PPU MMU 213 generates a page fault. The microcontroller 301 then executes a page fault sequence to remedy the page fault. Notably, the microcontroller 301 identifies that the particular virtual address is associated with a ZFOD status based on data included in the PSD 210. Advantageously, the microcontroller 301 optimizes the page fault sequence based on the ZFOD status. First, the microcontroller 301 identifies a reserved zero page included in the PPU memory 204. The reserved zero page is a zero-filled memory page included in the PPU memory 204 to which one or more virtual addresses may be mapped. None of the virtual addresses that are mapped to the reserved zero page have write access to the reserved zero page. Subsequently, the microcontroller 301 updates the PPU page table 208 to map the particular virtual address to the physical address associated with the reserved zero page. The microcontroller 301 then grants the particular virtual address read access to the reserved zero page. In addition, the microcontroller 301 updates the PSD 210 to reflect the status of the particular virtual address and the reserved zero page. In some embodiments, both the microcontroller 301 and the CPU 102 may independently and directly update the PSD 210. In such embodiments, to preserve the integrity of the PSD 210, the microcontroller 301 and the CPU 102 both update the PSD 210 via atomic memory operations.

If the software application attempts (via a particular virtual address) to write to a ZFOD memory page that is not stored in physical memory or to the reserved zero page, then the PPU MMU 213 generates a page fault associated with the write access. Again, the microcontroller 301 identifies that the particular virtual address is associated with a ZFOD status based on data included in the PSD 210. First, the microcontroller 301 identifies an unmapped page included in the PPU memory 204. The microcontroller 301 then writes binary zeros to all of the addresses included in the unmapped page. Subsequently, the microcontroller 301 updates the PPU page table 208 to map the particular virtual address to the physical address associated with the unmapped page. The microcontroller 301 then grants the particular virtual address both read and write access to the unmapped page. Further, the microcontroller 301 updates the PSD 210 to reflect the status and physical mapping of the particular virtual address. In particular, the microcontroller 301 updates the PSD 210 to reflect that the particular virtual address is no longer associated with a ZFOD state.

In this manner, the microcontroller 301 executes zero-fill-on-demand operations on a page-by-page basis as the software application attempts to access memory pages associated with a ZFOD status via different virtual addresses. In some embodiments, the PPU memory 204 may not be configured to include a reserved zero page. In such embodiments, the microcontroller 301 may respond to any fault associated with accessing a ZFOD page via a particular virtual address by mapping the particular virtual address to an unmapped page. In some embodiments, the microcontroller 301 maintains a list of unmapped zero-filled memory pages included in the PPU memory 204. As part of the page fault sequence, the microcontroller 301 selects a page from the list of unmapped zero-filled memory pages instead of allocating a physical page and filling the page with zeros. Consequently, the microcontroller 301 may execute the page fault sequence more quickly, thereby reducing the fault-handling latency. In a further optimization, the microcontroller 301 may be configured to fill unmapped physical pages with zeros in anticipation of mapping the unmapped physical pages later as part of a response to a ZFOD fault.

In a second example, the microcontroller 301 is configured to perform tasks related to copy-on-write (COW) operations. In some embodiments, multiple threads may have COW access to a single memory page via different virtual addresses. For example, after a process fork, two threads may share memory pages, but each thread accesses the memory pages via different virtual address spaces. In some embodiments, entries included in the PSD 210 associate the copy-on-write memory pages with a status of COW. The COW status may be reflected in any technically feasible fashion, such as a dedicated bit that indicates COW. Further, the page table entries in the PPU page table 208 associated with virtual addresses that are mapped to COW memory pages configure the PPU MMU 213 to fault on any write access via the virtual addresses.

The threads may read from the COW memory pages without generating a page fault. However, if a thread attempts to write to a COW memory page, then the PPU MMU 213 generates a page fault and interrupts the thread execution. The microcontroller 301 then executes a page fault sequence to remedy the page fault. Notably, the microcontroller 301 identifies that the particular virtual address is mapped to an original memory page that is associated with a COW status based on the data included in the PSD 210. The microcontroller 301 then identifies an unmapped page included in the PPU memory 204 as a new memory page and copies the original memory page to the new memory page. Subsequently, the microcontroller 301 updates the PPU page table 208 to map the particular virtual address to the physical address associated with the new memory page with both read and write access enabled. The thread now has a new physical copy of the original memory page that the thread can access with either read or write operations. As part of the fault-handling response, the microcontroller 301 updates the PSD 210 to reflect the status of the particular virtual address and the new memory page. In particular, the microcontroller 301 updates the PSD 210 to reflect that the particular virtual address and the new memory page are not associated with a COW status. In addition, depending on how many virtual addresses are still mapped to the original memory page, the UVM driver 101 may update the COW status associated with the original memory page.

In operation, the microcontroller 301 typically directs the copy engine 212 to copy the original memory page to the new memory page via the command queue 214. The command queue 214 may reside either in the system memory 104 or, preferably, in the PPU memory 204. In some embodiments, the microcontroller 301 may be configured to copy memory pages associated with a COW status in the background in anticipation of a write access to the memory pages. If the microcontroller 301 copies a COW page to a new memory page, then the microcontroller 301 may remap a particular virtual address to the new memory page. Further, if the microcontroller 301 performs such a series of operations before the particular virtual address issues a write request, then the PPU MMU 213 does not generate a page fault based on the write request.

In a third example, the microcontroller 301 is configured to perform lazy migration operations. As outlined previously herein, the PPU page table 208 does not include page table entries corresponding to CPU-owned memory pages in the system memory 104. Consequently, if the PPU 202 attempts to access a particular CPU-owned memory page in the system memory 104 via a particular virtual address, then the PPU MMU 213 generates a page fault. In response to the page fault, the UVM system 300 is configured to follow a page fault sequence that changes the ownership state of the particular memory page from CPU-owned to CPU-shared. An ownership state of CPU-shared allows both the CPU 102 and the PPU 202 to access the particular memory page in the system memory 104. Consequently, such a change in ownership resolves the page fault.

If the particular memory page is accessed frequently by the PPU 202, then the UVM system 300 may decide that the ownership state of the particular memory page should eventually be switched from CPU-shared to PPU-owned. However, changing the ownership state of a memory page from CPU-shared to PPU-owned involves transmitting the memory page from the system memory 104 to the PPU memory 204. Consequently, to enable optimal scheduling of the computer system 100 resources, the UVM system 300 may elect to opportunistically migrate the memory page to the PPU memory 204 at a later time in an "opportunistic/lazy migration" operation.

In one embodiment, the microcontroller 301 may update the PSD 210 to identify the status of the particular memory page as "lazy-migrate-to-PPU," thereby indicating that the particular memory page is a candidate for lazy migration. To ensure the integrity of the data, as part of associating a memory page with a "lazy-migrate-to-PPU" status, the UVM system 300 typically unmaps the memory page from the CPU 102. Notably, a principle of lazy migration is that the migration does not necessarily happen immediately and does not necessarily happen at all. In some embodiments, the migration execution is based on heuristics that determine the scheduling of operations within the UVM system 300.

In general, the microcontroller 301 scans the PSD 210 to identify memory pages associated with a lazy-migrate-to-PPU status. Upon identifying such a memory page, the microcontroller 301 may perform operations in preparation for an anticipated migration. In one embodiment, the microcontroller 301 identifies a physical address corresponding to an available page included in the PPU memory 204. Subsequently, the microcontroller 301 writes a string of potential lazy migration commands into the command queue 214 instructing the copy engine 212 to migrate the particular memory page to the location specified by the physical address. The potential lazy migration commands includes commands both to copy the particular memory page and to update the PPU page table 208 to reflect the migration. In alternative embodiments, the potential lazy migration commands include commands to copy the particular memory page and the microcontroller 301 updates the PPU page table 208 to reflect the migration after the copy is complete.

The UVM system 300 may determine that a migration is ready to occur in any technically feasible fashion. In one embodiment, upon determining that the migration is ready to occur, the microcontroller 301 sends an interrupt to the CPU 102. In operation, the copy engine 212 then executes the potential lazy migration commands. As part of the migration, the UVM system 300 updates the PSD 210 to indicate that the ownership state associated with the migrated page is PPU-owned. In this manner, the memory page opportunistically transitions from CPU-shared to PPU-owned.

Advantageously, the microcontroller 301 typically responds to both COW and ZFOD faults more quickly than components, such as the PPU fault handler 215, which respond to such faults in prior-art approaches. The microcontroller 301 is also configured to streamline certain page fault sequences using techniques, such as lazy migration, that enable threads to resume execution more quickly than in prior-art approaches. In addition, by performing operations in anticipation of potential memory accesses, the microcontroller 301 may further increase overall system performance.

Figure 4:
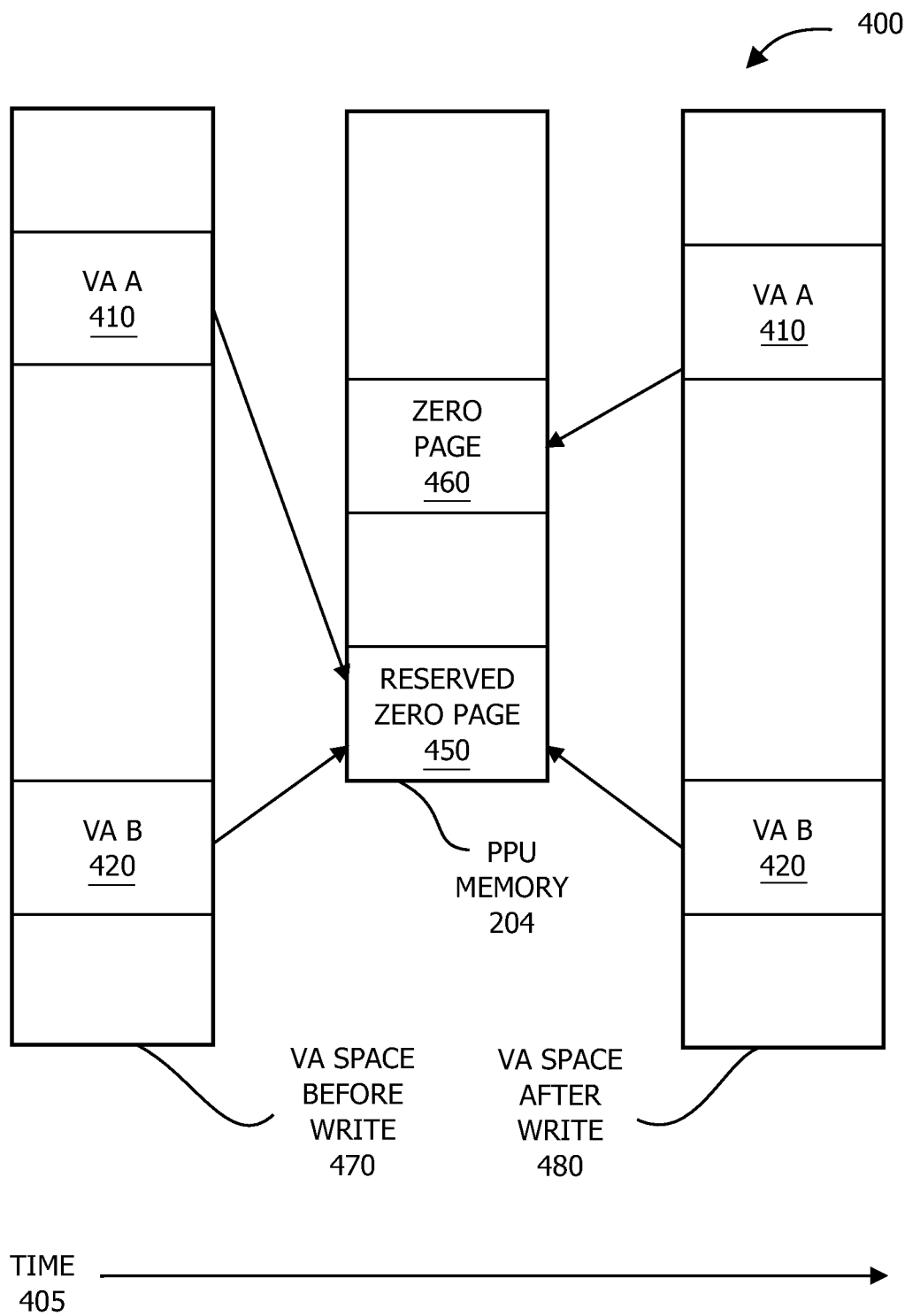
FIG. 4 is a conceptual diagram illustrating virtual addresses that are associated with zero-fill-on-demand (ZFOD) operations, according to one embodiment of the present invention.

FIG. 4 is a conceptual diagram illustrating virtual addresses that are associated with zero-fill-on-demand (ZFOD) operations, according to one embodiment of the present invention. As shown, FIG. 4 is organized sequentially in a time 405 order. A virtual address (VA) space before write 470 depicts the mappings of both a VA A 410 and a VA B 420 to the PPU memory 204 before the PPU 202 writes to the PPU memory 204 via the VA A 410. A VA space after write 480 depicts the mappings of both the VA A 410 and the VA B 420 to the PPU memory 204 after the PPU 202 writes to the PPU memory 204 via the VA A 410.

Before the PPU memory 204 writes to the VA A 410, the VA A 410 is mapped to a reserved zero page 450 included in the PPU memory 204. Similarly, the VA B 420 is also mapped to the reserved zero page 450. As disclosed previously herein, when the PPU memory 204 writes to the VA A 410, the PPU MMU 213 issues a fault. The microcontroller 301 responds to the fault by identifying a zero page 460 in the PPU memory 204. The microcontroller 301 may identify the zero page 460 in any technically feasible fashion. In one embodiment, the microcontroller 301 selects the zero page 460 from a list of unmapped zero-filled memory pages. In another embodiment, the microcontroller 301 allocates a memory page and writes a binary zero to each location included in the memory page, thereby creating the zero page 460. The microcontroller 301 updates the PPU page table 208 to reflect that the VA A 410 is mapped to the zero page 460 instead of to the reserved zero page 450. Further, the microcontroller 301 updates the PPU page table 208 to reflect that the VA A 410 has both read and write access to the zero page 460. Notably, the mapping of the VA B 420 to the reserved zero page 450 is not changed when the PPU memory 204 writes to the VA A 410.

Figure 5:
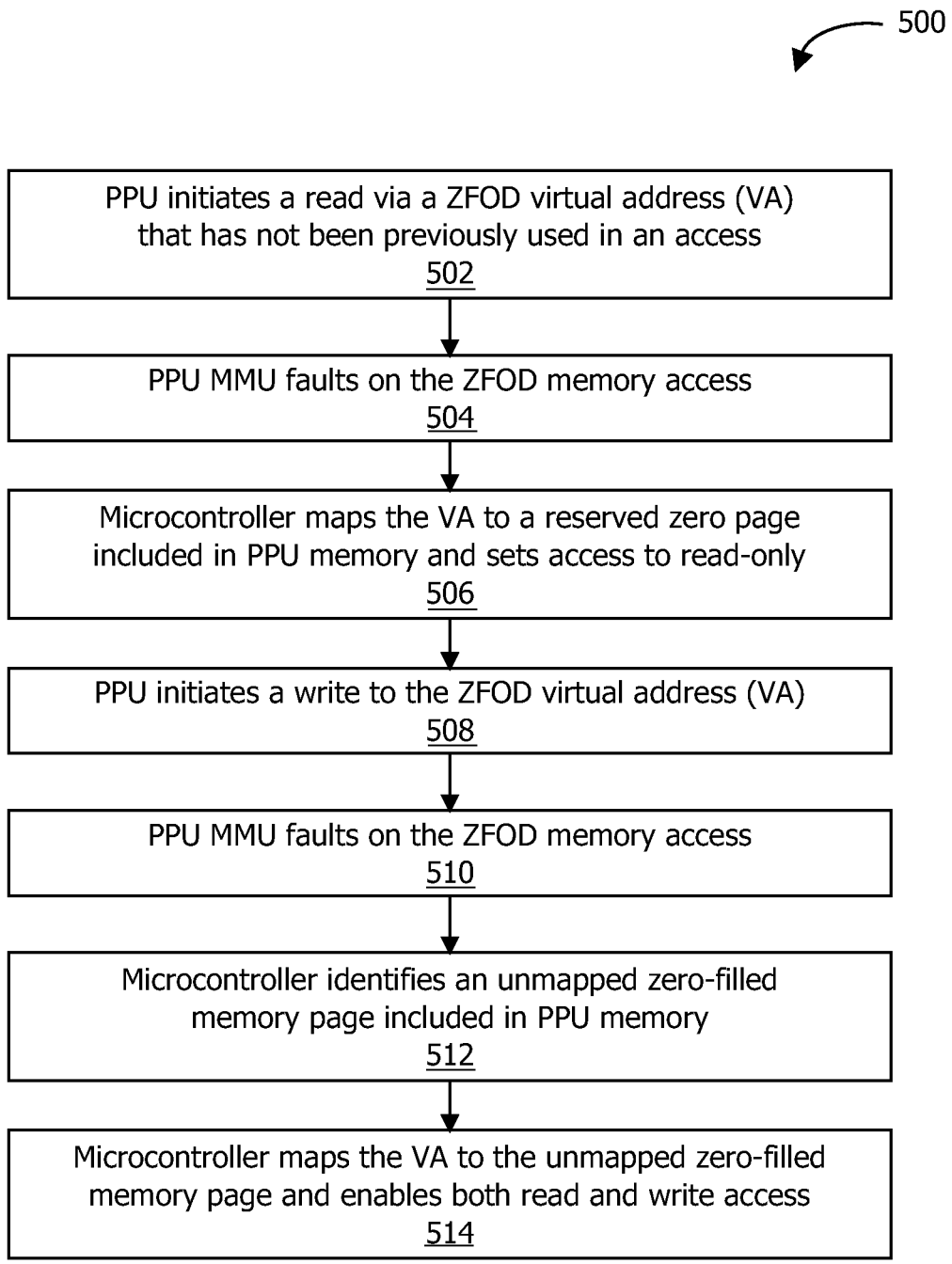
FIG. 5 is a flow diagram of method steps for managing memory accesses to zero-filled memory pages, according to one embodiment of the present invention.

FIG. 5 is a flow diagram of method steps for managing memory accesses to zero-filled memory pages, according to one embodiment of the present invention. Although the method steps are described herein in conjunction with the systems of FIGS. 1-4, persons skilled in the art will understand that any system configured to implement the method steps, in any order, falls within the scope of the present invention.

As shown, a method 500 begins at step 502, where the PPU 202 attempts to access a ZFOD page via a virtual address that has not been previously used to access the ZFOD page. As previously disclosed herein, a ZFOD memory page is zero-filled memory page that is associated with a ZFOD status. At step 504, the PPU MMU 213 generates a page fault associated with the virtual address. In one implementation, the PPU MMU 213 generates the page fault because the PPU page table 208 does not include an entry that corresponds to the virtual address. In an alternate implementation, the PPU MMU 213 generates a page fault because an entry in the PPU page table 208 that corresponds to the virtual address is marked to fault on any access.

At step 506, the microcontroller 301 determines that the virtual address is associated with a ZFOD status. In one implementation, the microcontroller 301 determines the ZFOD status of the virtual address based on data included in the PSD 210. In alternate implementations, the microcontroller 301 may determine the ZFOD status in any technically feasible fashion. After determining that the virtual address is associated with a ZFOD status, the microcontroller 301 updates the PPU page table 208 to map the virtual address to the reserved zero page 450 included in the PPU memory 104. The microcontroller 301 also updates to PPU page table 208 to allow the virtual address read-only access to the reserved zero page 450. Notably, restricting the access permission to read-only enables the UVM system 300 to map multiple ZFOD virtual addresses to the reserved zero page 450 without risking data collision.

At step 508, the PPU 202 attempts to write to the reserved zero page 450 via the virtual address. At step 510, the PPU MMU 213 generates a page fault because the page table entry included in the PPU page table 208 that corresponds to the virtual address does not permit write access to the reserved zero page 450. At step 512, the microcontroller 301 determines that the virtual address is associated with a ZFOD status. Again, the microcontroller 301 may determine the ZFOD status in any technically feasible fashion. After determining that the virtual address is associated with a ZFOD status, the microcontroller 301 selects a new memory page included in the PPU memory 204 from a list of unmapped zero-filled memory pages. In alternate embodiments, the microcontroller 301 allocates a memory page included in the PPU memory 204 as a new memory page and, subsequently, writes a value of binary zero to each location in the new memory page.

At step 514, the microcontroller 301 updates the PPU page table 208 to map the virtual address to the new memory page. The microcontroller 301 also updates to PPU page table 208 to enable both read and write access to the new memory page via the virtual address. As part of step 514, the microcontroller 301 coordinates with the UVM driver 101 to update the PSD 210 to reflect the changes in the virtual address mapping. In particular, the microcontroller 301 ensures that the entry in the PSD 210 that corresponds to the virtual address does not specify a ZFOD status.

Figure 6:
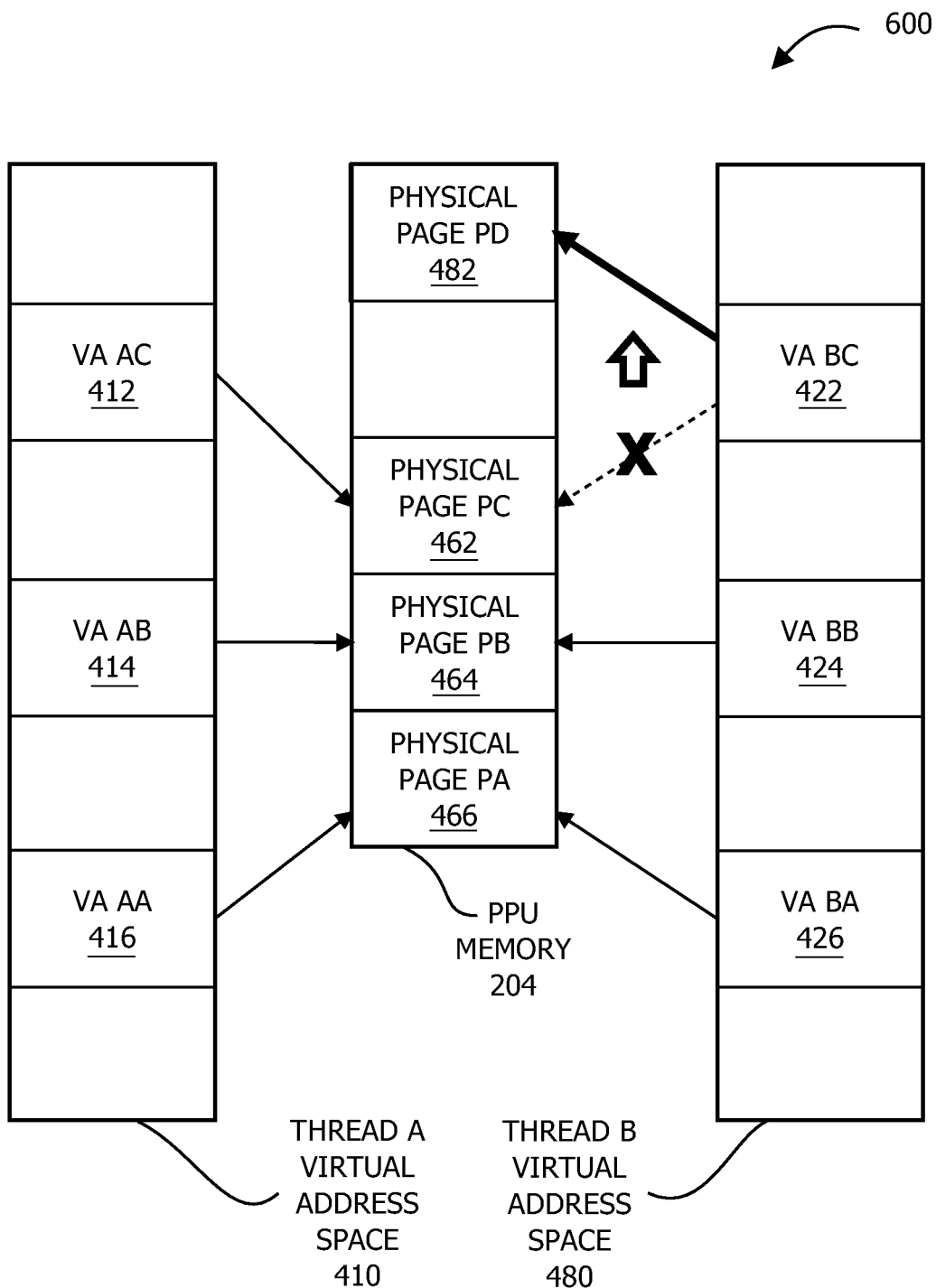
FIG. 6 is a conceptual diagram illustrating virtual addresses that are associated with copy-on-write (COW) operations, according to another embodiment of the present invention.

FIG. 6 is a conceptual diagram illustrating virtual addresses that are associated with copy-on-write (COW) operations, according to another embodiment of the present invention. As shown, FIG. 6 includes a thread A virtual address (VA) space 410 associated with a thread A that is executing on the PPU 202. As also shown, FIG. 6 includes a thread B virtual address (VA) space 480 associated with a thread B that is also executing on the PPU 202. Thread B is a result of a fork operation executed by thread A.

To conserve the PPU memory 204, the PPU MMU 213 is configured to share memory pages included in the PPU memory 204 between thread A and thread B. More specifically, each of the shared memory pages is accessed by thread A and thread B via the same VA in different VA spaces. To ensure the integrity of the data included in the shared memory pages, the PPU MMU 213 is configured to allow the corresponding VAs read-only access to the shared memory pages. Further, the shared memory pages are associated with a copy-on-write (COW) status. As shown, thread A accesses a physical page PA 466 via a VA AA 416, but thread B accesses the physical page PA 466 via a VA BA 426. And both the VA AA 416 and the VA 426 BA are associated with read-only access to the COW physical page PA 466.

Upon receiving a write access to a shared memory page, the PPU MMU 213 faults on the write request. FIG. 6 depicts the mapping of a VA BC 422 to the PPU memory 204 before a VA BC 422 write request with a dashed line. By contrast, FIG. 6 depicts the mapping of the VA BC 422 to the PPU memory 204 after the VA BC 422 write request with a solid line.

In operation, a physical page PC 462 is associated with a COW status, and the VA BC 422 is initially mapped to the physical page PC 462. Consequently, the PPU MMU 213 faults on the write request via the VA BC 422. The microcontroller 301 responds to this fault by identifying that the physical page PC 462 is associated with a COW status and executing an appropriate page fault sequence. The microcontroller 301 identifies a physical page PD 482 as an unmapped physical page in the PPU memory 204, and copies the data from the physical page PC 462 to the physical page PD 482. Subsequently, the microcontroller 301 updates the PPU page table 208 to map the VA BC 422 to the physical page PD 482. The microcontroller 301 also updates to PPU page table 208 to enable both read and write access to the physical page PD 482 via the VA BC 422. In some embodiments, the microcontroller 301 coordinates with the UVM driver 101 to update the PSD 210 to reflect these COW operations. In particular, the microcontroller 301 ensures that the entry in the PSD 210 that corresponds to the physical page PD 482 does not specify a COW status.

Figure 7:
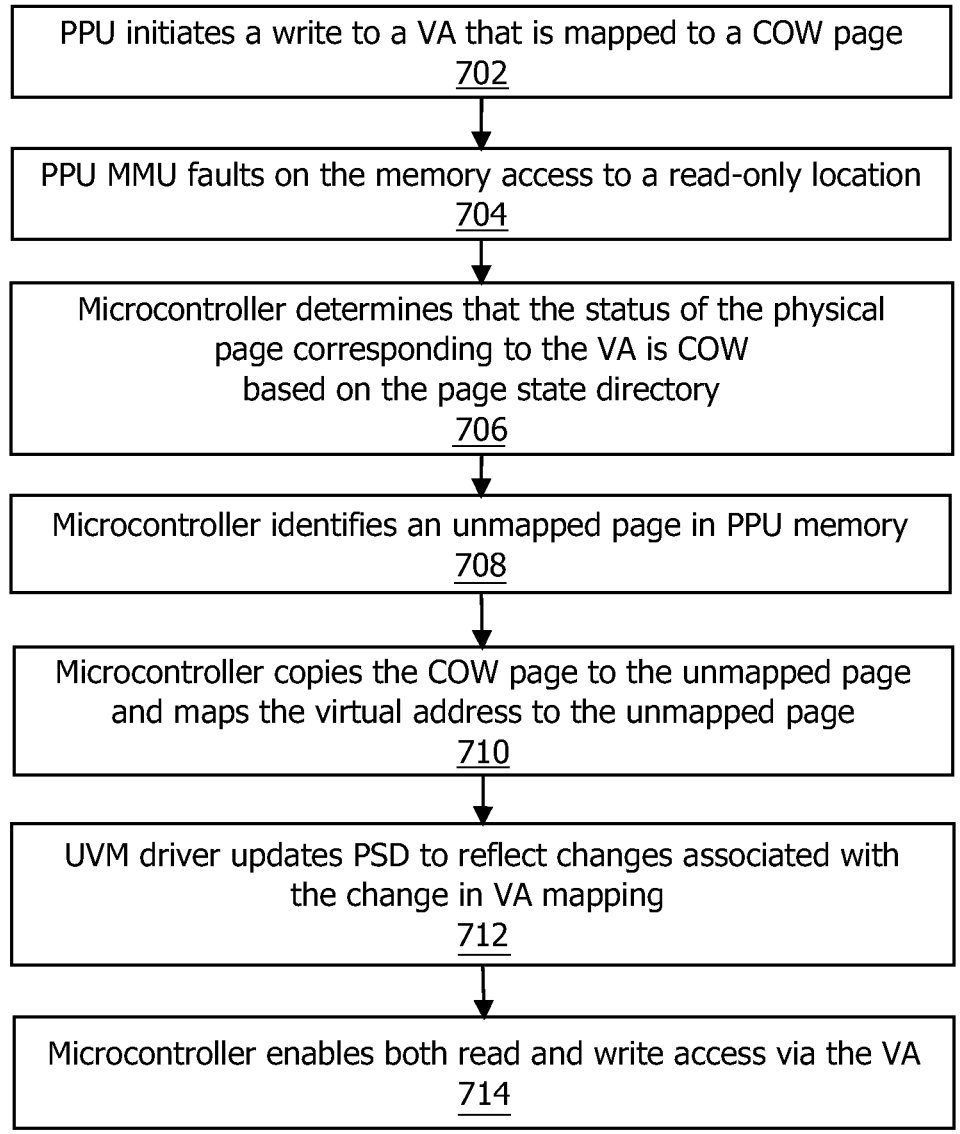
FIG. 7 is a flow diagram of method steps for managing memory accesses to copy-on-write memory pages, according to one embodiment of the present invention.

FIG. 7 is a flow diagram of method steps for managing memory accesses to copy-on-write memory pages, according to one embodiment of the present invention. Although the method steps are described herein in conjunction with the systems of FIGS. 1-3 and FIG. 6, persons skilled in the art will understand that any system configured to implement the method steps, in any order, falls within the scope of the present invention.

As shown, a method 700 begins at step 702, where the PPU 202 attempts to write to a COW memory page via a virtual address. At step 704, the PPU MMU 213 generates a page fault because the page table entry included in the PPU page table 208 that corresponds to the virtual address does not permit write access to the COW memory page. At step 706, the microcontroller 301 determines that the COW memory page is associated with a copy-on-write (COW) status. In one implementation, the microcontroller 301 determines the COW status of the memory page based on data included in the PSD 210. In alternate implementations, the microcontroller 301 may determine the COW status in any technically feasible fashion.

At step 708, the microcontroller 301 allocates a new memory page included in the PPU memory 204. More specifically, the microcontroller 301 identifies an unmapped memory page included in the PPU memory 204 to allocate as the new memory page. At step 710, the microcontroller 301 copies the data from the COW memory page to the new memory page and updates the PPU page table 208 to map the virtual address to map to the new memory page. In one embodiment, the microcontroller 301 directs the copy engine 212 to copy the COW memory page to the new memory page. Typically, the microcontroller 301 directs the copy engine through the command queue 214 that preferably resides in the PPU memory 204.

At step 712, the microcontroller 301 coordinates with the UVM driver 101 to update the PSD 210 to reflect the change in the virtual address mapping. In particular, the microcontroller 301 ensures that the entry in the PSD 210 that corresponds to the new memory page does not specify a COW status. At step 714, the microcontroller 301 updates the PPU page table 208 to enable both read and write access to the new memory page via the virtual address.

Figure 8:
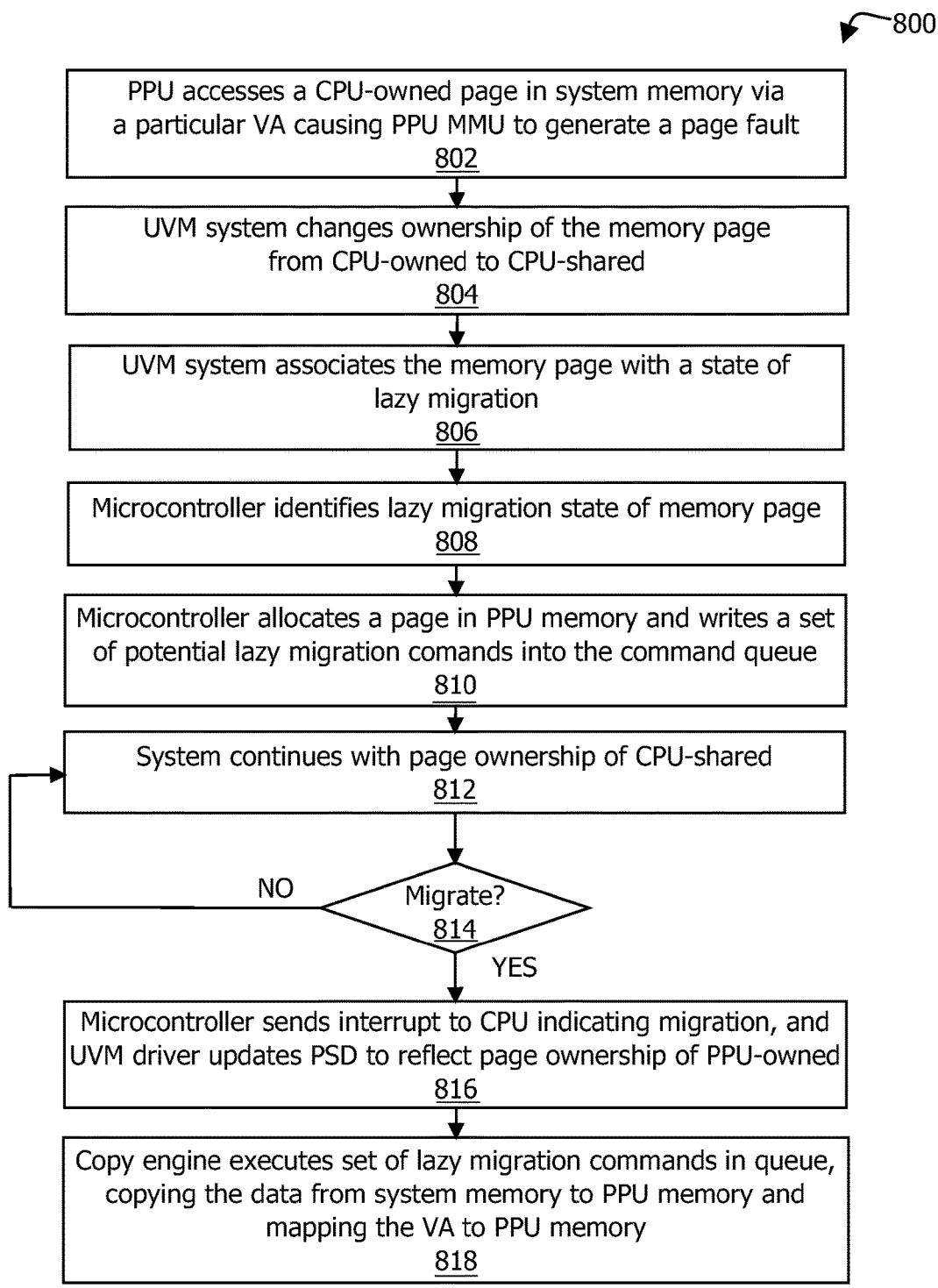
FIG. 8 is a flow diagram of method steps for performing lazy memory page migration, according to another embodiment of the present invention.

FIG. 8 is a flow diagram of method steps for performing lazy memory page migration, according to another embodiment of the present invention. Although the method steps are described herein in conjunction with the systems of FIGS. 1-3, persons skilled in the art will understand that any system configured to implement the method steps, in any order, falls within the scope of the present invention.

As shown, a method 800 begins at step 802, where the PPU 202 attempts to access a particular CPU-owned memory page stored in the system memory 104 via a particular virtual address. The PPU MMU 213 generates a page fault because the PPU page table 208 does not include a page table entry that corresponds to the particular CPU-owned memory page. At step 804, the UVM system 300 responds to the page fault. In particular, the UVM system 300 switches the ownership state of the particular memory page from CPU-owned to CPU-shared. As outlined previously herein, an ownership state of CPU-shared allows both the CPU 102 and the PPU 202 to access the particular memory page stored in the system memory 104. As part of transitioning the particular memory page to CPU-shared ownership, the microcontroller 301 updates the PPU page table 208 to map the particular virtual address to the particular memory page. In alternate embodiments, components within the UVM system 300 may update the PPU page table 208 mapping. Advantageously, updating the ownership state of the memory page to CPU-shared allows the PPU 202 to quickly recover from the PPU 202 memory access fault.

At step 806, the UVM system 300 determines that the desired ownership state of the particular memory page is PPU-owned. A PPU-owned memory page is typically stored in the PPU memory 204. As part of step 806, the UVM system 300 updates the entry in the page state directory (PSD) 210 that corresponds to the particular memory page to reflect a lazy-migrate-to-PPU status. In some implementations, the UVM system 300 also updates the CPU page table 206 to unmap the particular memory page.

At step 808, the microcontroller 301 accesses the PSD 202 and identifies that the particular memory page has a lazy-migrate-to-PPU status. At step 810, the microcontroller 301 allocates a physical page in the PPU memory 204 and writes a set of potential lazy migration commands into the command queue 214. As outlined previously herein, the command queue 214 contains commands for execution by the copy engine 212. Notably, the potential lazy migration commands are not necessarily executed. At step 812, the computer system 100 continues operating with the ownership of the particular memory page as CPU-shared. If, at step 814, the UVM system 300 determines that a migration is not ready to occur, then the method returns to step 812. The computer system 100 cycles through steps 812-814, continuing to operate with the memory page in an ownership state of CPU-shared until the UVM system 300 determines that a migration is ready to occur.

At step 814, if the UVM system 300 determines that a migration is ready to occur, then the method proceeds to step 816. At step 816, the microcontroller 301 sends an interrupt to the CPU 102 indicating that the particular memory page is migrating from the system memory 104 to the PPU memory 204. The microcontroller 301 may determine that a migration is ready to occur in any technically feasible fashion. Further, in alternate implementations, any appropriate entity included in the computer system 100 may be configured to implement heuristic algorithms associated with lazy migration and, based on these algorithms, indicate a lazy migration. As part of the migration, the UVM system 300 updates the PSD 210 to change the ownership of the particular memory page from CPU-shared to PPU-owned. At step 818, the copy engine 212 executes the set of potential lazy migration commands that the microcontroller 301 previous wrote to the command queue 214. Executing the potential lazy migration commands copies the memory page from the system memory 104 to the PPU memory 204 and maps the particular virtual address to the physical address backed by the PPU memory 204, thereby completing the lazy migration operation.

In sum, a microcontroller is associated with a parallel processing unit (PPU) memory management unit (MMU) to enable the memory subsystem to process PPU faults more efficiently. The microcontroller is configured to coordinate with the PPU MMU to handle one or more tasks related to memory access operations initiated by threads executing within the PPU. By offloading such tasks to the microcontroller, the overall performance of the memory subsystem may be increased. By contrast, in prior-art systems such tasks are handled by one or more other elements, such as a PPU fault handler, that typically execute on the CPU.

In a first instance, the microcontroller is configured to assist the PPU MMU in performing zero-fill-on-demand (ZFOD) operations. On a first, read access to a zero-filled memory page via a virtual address (VA), the PPU MMU faults on the memory access because the VA is not backed by physical memory. In response to this fault, the microcontroller maps the VA to a reserved zero-filled memory page included in the PPU memory and sets the access to read-only. Notably, multiple virtual addresses may map to the same reserved zero-filled physical page. On a subsequent write access via the virtual address, the PPU MMU faults on the memory access because the virtual address does not have write access to the reserved zero-filled page. In response to this fault, the microcontroller maps the virtual address to an unmapped zero-filled physical page included in the PPU memory and sets the access to both read and write.

In a second instance, the microcontroller is configured to assist the PPU MMU in performing copy-on-write (COW) operations. In some instances, such as a process fork, multiple threads may have access to a single page. The page may be designated a COW page, and each process is granted read access to the page via a different VA. If a thread attempts a write access to such a COW page via a particular VA, then the PPU MMU generates a page fault based on the read-only status of the page table entry corresponding to the particular VA. In response to this fault, the microcontroller copies the COW page to an unmapped physical page included in the PPU memory. The microcontroller then maps the VA to the previously unmapped physical page and sets the access to both read and write. As part of the fault response, the microcontroller coordinates with the UVM drive to update the PSD to reflect the changes associated with the COW operations.

In a third instance, the microcontroller is configured to assist the PPU MMU in performing lazy migration operations. In some instances, when the PPU accesses a CPU-owned page in system memory via a VA, the UVM driver may determine to initially change the page ownership state from CPU-owned to CPU-shared. Such a change allows the PPU to recover from the PPU memory access fault. However, based on heuristic information, the UVM driver may also determine that the page is a candidate for later, opportunistic (i.e., lazy) migration to an ownership state of PPU-owned, where the page is stored in PPU memory instead of system memory. In one instance, the UVM driver updates an entry in the page state directory (PSD) that corresponds to the page to reflect a lazy-migrate-to-PPU status.

Subsequently, the microcontroller identifies a page as a candidate for lazy migration based on information included in the page state directory. In preparation for a possible migration of the page from system memory to PPU memory, the microcontroller allocates storage for the page in the PPU memory. The microcontroller also writes a string of potential lazy migration commands into a command queue for possible execution by a copy engine at a later time. The system continues to operate with the page in a CPU-shared ownership state until the UVM system migrates the page. The UVM driver updates the PSD to reflect that the page is now PPU-owned and the copy engine executes the lazy migration commands. Thus, the page transitions from CPU-shared to PPU-owned in an opportunistic manner.

Advantageously, by using a microcontroller to perform various memory subsystem access operations, the computer system may more effectively remedy PPU page faults. In particular, the microcontroller may reduce PPU fault handling latency compared to prior-art techniques. Consequently, the performance of threads executing on the PPU may be increased. In addition, the microcontroller reduces the overall amount of work the CPU performs in managing certain PPU-related page faults. The microcontroller also reduces the number of interactions between the PPU and the CPU. Thus, the disclosed techniques may further increase overall system efficiency compared to prior-art techniques where a microcontroller does not assist with remedying PPU page faults.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A system configured to perform virtual memory operations, the system comprising:
a first memory that includes a page table having a plurality of page table entries;
a memory management unit coupled to the first memory and included within a parallel processing unit, wherein the parallel processing unit is separate from a central processing unit within the system, and wherein the memory management unit is configured to:

process requests for translating virtual memory addresses to physical memory addresses, and
manage the plurality of page table entries; and
a microcontroller coupled to the memory management unit and included within the parallel processing unit, wherein updates made to the page table in order to remedy page faults that are generated only when the parallel processing unit accesses the first memory are offloaded to the microcontroller.

2. The system of claim 1, wherein the page fault is associated with a reserved zero-filled page included in the first memory.

3. The system of claim 2, wherein the one or more operations comprise:
receiving the page fault, wherein the page fault is associated with a write attempt via a first virtual memory address;
determining that the first virtual memory address is mapped to the reserved zero-filled page;
selecting a first memory page, wherein no virtual memory address is mapped to the first memory page, and every entry included in the first memory page has a value of binary zero;
updating a first page table entry included in the plurality of page table entries to map the first virtual memory address to the first memory page; and
activating both a read permission bit and a write permission bit included in the first page table entry.

4. The system of claim 3, wherein the one or more operations further comprise deactivating a status of zero-fill-on-demand in a state entry that is associated with the first virtual memory address.

5. The system of claim 4, wherein the state entry is included in a page state directory included in a second physical memory.

6. The system of claim 2, wherein the one or more operations comprise:
receiving the page fault, wherein the page fault is associated with a write attempt via a first virtual memory address;
determining that the first virtual memory address is mapped to the reserved zero-filled page;
allocating a first memory page;
setting every entry included in the first memory page to a value of binary zero;
updating a first page table entry included in the plurality of page table entries to map the first virtual memory address to the first memory page; and
activating both a read permission bit and a write permission bit included in the first page table entry.

7. The system of claim 1, wherein the page fault is associated with a copy-on-write page included in the first memory.

8. The system of claim 7, wherein the one or more operations comprise:
receiving the page fault, wherein the page fault is associated with a write attempt via a first virtual memory address;
determining that the first virtual memory address is mapped to the copy-on-write page;
selecting a first memory page, wherein no virtual memory address is mapped to the first memory page;
copying the copy-on-write page to the first memory page;
updating a first page table entry included in the plurality of page table entries to map the first virtual memory address to the first memory page; and
activating both a read permission bit and a write permission bit included in the first page table entry.

9. The system of claim 8, wherein the one or more operations further comprise:
determining that only one virtual memory address is mapped to the copy-on-write page; and
deactivating a status of copy-on-write in a state entry that is associated with the copy-on-write page.

10. The system of claim 9, wherein the state entry is included in a page state directory included in a second physical memory.

11. The system of claim 1, wherein the page fault is associated with a first virtual memory address that is not associated with any page table entries included in the plurality of page table entries.

12. The system of claim 11, wherein the one or more operations comprise updating a first page table entry included in the plurality of page table entries to map the first virtual memory address to a first memory page included in a second memory.

13. The system of claim 1, wherein page faults generated when the central processing unit accesses the first memory are not offloaded to the microcontroller.

14. A computing device, comprising:
a first memory that includes a page table having a plurality of page table entries;
a memory management unit included within a parallel processing unit, wherein the parallel processing unit is separate from a central processing unit within the system, the memory management unit configured to:
process requests for translating virtual memory addresses to physical memory addresses, and
manage the plurality of page table entries; and
a microcontroller included within the parallel processing unit, wherein updates made to the page table in order to remedy page faults that are generated only when the parallel processing unit accesses the first memory are offloaded to the microcontroller.

15. The computing device of claim 14, wherein the one or more operations comprise:
receiving the page fault, wherein the page fault is associated with a write attempt via a first virtual memory address;
determining that the first virtual memory address is mapped to a reserved zero-filled page;
selecting a first memory page, wherein no virtual memory address is mapped to the first memory page, and every entry included in the first memory page has a value of binary zero;
updating a first page table entry included in the plurality of page table entries to map the first virtual memory address to the first memory page; and
activating both a read permission bit and a write permission bit included in the first page table entry.

16. The computing device of claim 14, wherein the one or more operations comprise:
receiving the page fault, wherein the page fault is associated with a write attempt via a first virtual memory address;
determining that the first virtual memory address is mapped to a copy-on-write page;
selecting a first memory page, wherein no virtual memory address is mapped to the first memory page;
copying the copy-on-write page to the first memory page;
updating a first page table entry included in the plurality of page table entries to map the first virtual memory address to the first memory page; and activating both a read permission bit and a write permission bit included in the first page table entry.

17. The computing device of claim 14, wherein the one or more operations comprise:
receiving the page fault, wherein the page fault is associated with a first virtual memory address that is not associated with any page table entries included in the plurality of page table; and
updating a first page table entry included in the plurality of page table entries to map the first virtual memory address to a first memory page included in a second memory.

18. The computing device of claim 13, wherein page faults generated when the central processing unit accesses the first memory are not offloaded to the microcontroller.

19. A computer-implemented method for performing virtual memory operations, the method comprising:
receiving, at a memory management unit, a page fault associated with a first virtual memory address and generated by a parallel processing unit, wherein the parallel processing unit is separate from a central processing unit within the system; and
performing, via a microcontroller included within the parallel processing unit, one or more operations to remedy the page fault, wherein the one or more operations include translating the first virtual memory address to a corresponding physical memory address, and wherein page faults that are generated only when the parallel processing unit accesses a first memory are offloaded to the microcontroller.

20. The method of claim 19, wherein the one or more operations comprise:
determining that the first virtual memory address is mapped to a reserved zero-filled page;
selecting a first memory page, wherein no virtual memory address is mapped to the first memory page, and every entry included in the first memory page has a value of binary zero;
updating a first page table entry included in a page table to map the first virtual memory address to the first memory page; and
activating both a read permission bit and a write permission bit included in the first page table entry.

21. The method of claim 19, wherein the one or more operations comprise:
determining that the first virtual memory address is mapped to a copy-on-write page;
selecting a first memory page, wherein no virtual memory address is mapped to the first memory page;
copying the copy-on-write page to the first memory page;
updating a first page table entry included in a page table to map the first virtual memory address to the first memory page; and
activating both a read permission bit and a write permission bit included in the first page table entry.

22. The method of claim 19, wherein the one or more operations comprise:
determining that the first virtual memory address is not associated with any page table entries included in a page table stored in a first memory; and
updating a first page table entry included in the plurality of page table entries to map the first virtual memory address to a first memory page included in a second memory.

23. The system of claim 1, wherein the microcontroller is further configured to update an entry in a page state directory to reflect a status associated with the one or more operations via an atomic memory operation.

24. The method of claim 19, wherein page faults generated when the central processing unit accesses the first memory are not offloaded to the microcontroller.

* * * * *

UNITED STATES PATENT AND TRADEMARK OFFICE
CERTIFICATE OF CORRECTION

| | |
|---|---|
| PATENT NO. | : 10,409,730 B2 |
| APPLICATION NO. | : 14/011643 |
| DATED | : September 10, 2019 |
| INVENTOR(S) | : Cameron Buschardt et al. |

Page 1 of 1

It is certified that error appears in the above-identified patent and that said Letters Patent is hereby corrected as shown below:

In the Claims

Column 29, Claim 18, Line 12, please delete "claim 13" and insert --claim 14--.

Signed and Sealed this
Twenty-fourth Day of December, 2019

Andrei Iancu
*Director of the United States Patent and Trademark Office*